US010616146B1

(12) United States Patent
Hopkins et al.

(10) Patent No.: US 10,616,146 B1
(45) Date of Patent: Apr. 7, 2020

(54) COMPUTING DEVICE AND METHOD FOR MESSAGE CONSTRUCTION AND PROCESSING BASED UPON HISTORICAL DATA

(71) Applicant: McKesson Corporation, Irving, TX (US)

(72) Inventors: Stacy Hopkins, Loganville, GA (US); Beth Kaye, Suwanee, GA (US)

(73) Assignee: MCKESSON CORPORATION, Irving, TX (US)

( * ) Notice: Subject to any disclaimer, the term of this patent is extended or adjusted under 35 U.S.C. 154(b) by 101 days.

(21) Appl. No.: 15/427,746

(22) Filed: Feb. 8, 2017

(51) Int. Cl.
G06F 15/16 (2006.01)
H04L 12/58 (2006.01)

(52) U.S. Cl.
CPC .............. H04L 51/02 (2013.01); H04L 51/16 (2013.01)

(58) Field of Classification Search
CPC ......... H04L 51/36; H04L 51/22; H04L 12/58; H04L 51/02; H04L 51/08; H04L 51/16; H04L 51/18; H04L 51/30; G06F 17/30867; G06F 17/30; G06Q 10/107
See application file for complete search history.

(56) References Cited

U.S. PATENT DOCUMENTS 5,628,530 A   5/1997  Thornton
6,012,035 A   1/2000  Freeman et al.
6,463,462 B1 * 10/2002  Smith .................. G06Q 10/107
                                                        709/206

(Continued)

FOREIGN PATENT DOCUMENTS

CA         2482370       3/2006
WO    WO 1995003569     2/1995

(Continued)

OTHER PUBLICATIONS

Anonymous, ACS to Demonstrate Electronic Health Record Solution Suite at MMIS 2007 Conference; EHR Tools Consolidate Data, Provide Useful Information at the Point of Care for Medicaid Providers, Payers, and Patients, PR Newswire, Aug. 13, 2007, New York, NY, USA.

(Continued)

*Primary Examiner* — Cheikh T Ndiaye
(74) *Attorney, Agent, or Firm* — Alston & Bird LLP (57) ABSTRACT

A computing device, method and computer program product are provided to process messages received from a source and to construct messages transmitted to a recipient that include the information required to elicit the desired response. In relation to a method, an electronic message is received and analyzed relative to requirements of the related message to determine whether the electronic message includes information required by the related message. If the analysis determines that the electronic message fails to satisfy the requirements of the related message, the method searches historical data related to prior messages to identify additional information sufficient in combination with the information provided by the electronic message to satisfy the requirements of the related message, constructing the related message based upon the additional information identified from the historical data and the information provided by the electronic message, and causing the related message to be transmitted to a request processor.

20 Claims, 5 Drawing Sheets

(56) References Cited

U.S. PATENT DOCUMENTS

| | | |
|---|---|---|
| 6,757,898 B1 | 6/2004 | Llsen et al. |
| 6,769,228 B1 | 8/2004 | Mahar |
| 7,155,397 B2 | 12/2006 | Alexander et al. |
| 8,036,913 B1 | 10/2011 | Pinsonneault |
| 8,036,914 B1 | 10/2011 | Pinsonneault |
| 10,417,380 B1 | 9/2019 | Kaye et al. |
| 2001/0029483 A1 | 10/2001 | Schultz et al. |
| 2001/0056359 A1 | 12/2001 | Abreu |
| 2002/0002495 A1 | 1/2002 | Ullman |
| 2002/0032582 A1 | 3/2002 | Feeney et al. |
| 2002/0087583 A1 | 7/2002 | Morgan et al. |
| 2002/0111832 A1 | 8/2002 | Judge |
| 2002/0198831 A1 | 12/2002 | Patricelli et al. |
| 2003/0009367 A1 | 1/2003 | Morrison |
| 2003/0050799 A1 | 3/2003 | Jay et al. |
| 2003/0149625 A1 | 8/2003 | Leonardi et al. |
| 2003/0154163 A1 | 8/2003 | Phillips et al. |
| 2003/0187690 A1 | 10/2003 | Miller et al. |
| 2003/0229540 A1 | 12/2003 | Algiene |
| 2004/0039599 A1 | 2/2004 | Fralic |
| 2004/0059607 A1 | 3/2004 | Ball et al. |
| 2004/0073457 A1 | 4/2004 | Kalies |
| 2004/0078234 A1 | 4/2004 | Tallal, Jr. |
| 2004/0117323 A1 | 6/2004 | Mindala |
| 2004/0148198 A1 | 7/2004 | Kalies |
| 2004/0249745 A1 | 12/2004 | Baaren |
| 2005/0015280 A1 | 1/2005 | Gabel et al. |
| 2005/0060201 A1 | 3/2005 | Connely, III et al. |
| 2005/0102169 A1 | 5/2005 | Wilson |
| 2005/0154627 A1 | 7/2005 | Zuzek et al. |
| 2005/0187793 A1 | 8/2005 | Myles |
| 2005/0197862 A1 | 9/2005 | Paterson et al. |
| 2005/0240473 A1 | 10/2005 | Ayers, Jr. et al. |
| 2005/0288972 A1 | 12/2005 | Marvin et al. |
| 2006/0020514 A1 | 1/2006 | Yered |
| 2006/0026041 A1 | 2/2006 | Ullman |
| 2006/0149784 A1 | 7/2006 | Tholl et al. |
| 2006/0184391 A1 | 8/2006 | Barre et al. |
| 2006/0224417 A1 | 10/2006 | Werner |
| 2006/0259363 A1 | 11/2006 | Jhetam |
| 2007/0005402 A1 | 1/2007 | Kennedy et al. |
| 2007/0050209 A1 | 3/2007 | Yered |
| 2007/0136100 A1 | 6/2007 | Daugherty et al. |
| 2007/0233525 A1 | 10/2007 | Boyle |
| 2007/0233526 A1 | 10/2007 | Hoffman et al. |
| 2007/0239493 A1 | 10/2007 | Sweetland et al. |
| 2008/0103836 A1 | 5/2008 | Park et al. |
| 2008/0262948 A1 | 10/2008 | Grady et al. |
| 2010/0030667 A1 | 2/2010 | Chudy et al. |
| 2010/0145730 A1 | 6/2010 | Abreu |
| 2010/0293236 A1* | 11/2010 | Wisner ................ G06Q 10/107 709/206 |
| 2011/0161109 A1 | 6/2011 | Pinsonneault et al. |
| 2016/0359795 A1* | 12/2016 | Fehling ................ G06Q 10/107 |
| 2017/0034087 A1* | 2/2017 | Borenstein .............. H04L 51/08 |
| 2017/0324695 A1* | 11/2017 | Fischer .................. H04L 51/18 |

FOREIGN PATENT DOCUMENTS

| | | |
|---|---|---|
| WO | WO 2000039737 | 7/2000 |
| WO | WO 2007025295 | 3/2007 |

OTHER PUBLICATIONS

Anonymous, Medic; On-line Goes In-House, Chain Store Age Executive, Jan. 1987, vol. 63, Issue 1, USA; only.

Anonymous, Pharmacy Industry Leaders Launch Firm to Supply Real-Time Data. PR Newswire. Jul. 30, 2001, p. 1, York, NY, USA.

Anonymous, TechRx Announces Sucessful Beta Deployment of T-Rex. PR Newswire. May 13, 2002.

Final Office Action for U.S. Appl. No. 13/827,676 dated Jul. 13, 2015.

Final Office Action for U.S. Appl. No. 14/145,027 dated Nov. 19, 2015.

Lamb, J., New Era of Electronic Medicine Manaeiement: E-Pre-scriptions, Britain's Traditionally Cautious National Health Service is Starting Trials for Online Prescription, with the Aim of Cutting Costs. Financial Times, London, Feb. 21, 2001, p. 6, London, United Kingdom.

Non-Final Office Action U.S. Appl. No. 12/388,956 dated Feb. 3, 2011.

Non-Final Office Action for U.S. Appl. No. 13/827,676 dated Dec. 26, 2014

Non-final Office Action for U.S. Appl. No. 13/827,676 dated Dec. 30, 2015.

Non-Final Office Action for U.S. Appl. No. 14/145,027 dated Mar. 23, 2015.

Notice of Allowance for U.S. Appl. No. 12/388,956 dated Jun. 14, 2011.

Sampson, R.J., Taking Control of Health Care Costs, Best's Review—Life Health Insurance Edition, Nov. 1983, 84, Issue 7, USA; Abstract only.

* cited by examiner

COMPUTING DEVICE AND METHOD FOR MESSAGE CONSTRUCTION AND PROCESSING BASED UPON HISTORICAL DATA

TECHNOLOGICAL FIELD

An example embodiment of the present invention relates generally to the construction and processing of messages and, more particularly, to the construction and processing of a message based upon an analysis of a received message and reference to historical data.

BACKGROUND

Messages are frequently transmitted from a source to a recipient for a variety of different purposes. For example, the message may convey a request that is received by the recipient and for which a response is subsequently formulated by the recipient in order to convey the requested information to the source.

In order to elicit the proper response or other action by the recipient, the message provided by the source must generally include certain types of information. For example, the message may need to include information identifying the subject of the message in a manner that is recognizable by the recipient. As another example, the message provided by the source must properly identify the recipient such that the message is routed to the desired recipient. If the message provided by the source does not include the requisite information, such as information identifying the subject to the message and/or information properly identifying the recipient of the message, the message may not produce the desired result. For example, in an instance in which the message is a request for information from the recipient, a message that lacks the requisite information may not elicit a response that provides the requested information.

In instances in which a message lacks some of the information required to elicit the desired response from an intended recipient, additional messages may sometimes be generated in order to request the requisite information from the source and for the source to provide the additional information that is required by the recipient in order to properly formulate a response to the original message. This additional messaging consumes a number of system resources, both in conjunction with the transmission of the additional messages as well as in regards to the generation and processing of the additional messages, thereby further burdening the network and the various entities communicating via the network.

BRIEF SUMMARY

A computing device, method and computer program product are provided in accordance with an example embodiment in order to process messages received from a source and to construct messages transmitted to a recipient in such a manner as to more frequently include the information required to elicit the desired response from the recipient. In this regard, the computing device, method and computer program product of an example embodiment may search and analyze historical data in order to obtain information that, in combination with the information provided by the message received from the source, permits a message to be constructed for transmission to the recipient that includes the information required to elicit the desired response from the recipient. Thus, by the selective reliance upon historical data, the computing device, method and computer program product of an example embodiment may reduce the instances in which additional messages must be transmitted and processed in an effort to obtain the information required to elicit the desired response from the recipient, thereby reducing the burden on the network and the various entities communicating via the network.

A computing device is provided in accordance with an example embodiment that is configured to analyze an electronic message and to construct a related message based upon analysis of the electronic message. The computing device includes a communication interface configured to receive the electronic message. The computing device also includes processing circuitry configured to analyze the electronic message relative to requirements of the related message to determine whether the electronic message includes information required by the related message, such as may be defined by a request processor to which the related message may be transmitted. In an instance in which the analysis of the electronic message determines that the electronic message satisfies the requirements of the related message, the processing circuitry is configured to cause the related message to be transmitted to the request processor based upon information provided by the electronic message. In an instance in which the analysis of the electronic message determines that the electronic message fails to satisfy the requirements of the related message, the processing circuitry is configured to search historical data related to prior messages in order to identify additional information sufficient in combination with the information provided by the electronic message to satisfy the requirements of the related message, construct the related message based upon the additional information identified from the historical data and the information provided by the electronic message, and cause the related message to be transmitted to the request processor. The processing circuitry is configured to receive a response from the request processor based upon the related message. The processing circuitry is configured to construct a response to the electronic message that is to be transmitted based upon the response from the request processor. The computing device further includes a database in communication with the processing circuitry and configured to store one or more of the historical data related to prior messages, the electronic message, the related message, the response from the request processor or the response to the electronic message.

In an example embodiment in which the electronic message includes identification information, the processing circuitry is configured to search historical data to identify historical data related to one or more prior messages that have matching identification information to that included within the electronic message. In this embodiment, the processing circuitry is also configured to construct the related message by constructing the related message based upon information from the historical data related to the one or more prior messages that have matching identification information in combination with the information provided by the electronic message. In an embodiment in which the electronic message includes information identifying a preferred supplier, the processing circuitry is configured to search historical data to identify historical data related to one or more prior messages that also reference the preferred supplier. Additionally or alternatively, the processing circuitry of an example embodiment is configured to search historical data within a predefined window of time.

The processing circuitry of an example embodiment is further configured to determine whether a configuration required by the request processor is predefined. In an instance in which the configuration is predefined, the processing circuitry is configured to construct the related message by constructing the related message based upon the configuration required by the request processor. However, in an instance in which the configuration is not predefined, the processing circuitry is configured to search historical data to identify information regarding a configuration required by the request processor. In addition, the processing circuitry of this example embodiment is further configured to construct a trial configuration for the request processor based upon historical data related to one or more prior messages exchanged with one or more processors other than the request processor. In this regard, the processing circuitry of an example embodiment is configured to construct the trial configuration by constructing the trial configuration including one or more data fields based upon a frequency with which the one or more data fields were included in historical data related to one or more prior messages exchanged with one or more processors other than the request processor.

The processing circuitry of an example embodiment is further configured to identify a second electronic message that is a duplicate of the electronic message and that was received via a different connection than the electronic message. In this example embodiment, the processing circuitry is further configured to defer processing of the second electronic message and to construct a response to the second electronic message based upon the response constructed to the prior electronic message that is to be transmitted via the different connection.

In another example embodiment, a method is provided for analyzing an electronic message and constructing a related message based upon analysis of the electronic message. The method includes receiving the electronic message and analyzing the electronic message relative to requirements of the related message to determine whether the electronic message includes information required by the related message. In an instance in which the analysis of the electronic message determines that the electronic message satisfies the requirements of the related message, the method includes causing the related message to be transmitted to a request processor based upon information provided by the electronic message. However, in an instance in which the analysis of the electronic message determines that the electronic message fails to satisfy the requirements of the related message, the method includes searching historical data related to prior messages in order to identify additional information sufficient in combination with the information provided by the electronic message to satisfy the requirements of the related message, constructing the related message based upon the additional information identified from the historical data and the information provided by the electronic message, and causing the related message to be transmitted to the request processor. The method receives a response from the request processor based upon the related message. The method constructs a response to the electronic message that is to be transmitted based upon the response from the request processor. The method further includes storing one or more of the historical data related to prior messages, the electronic message, the related message, the response from the request processor or the response to the electronic message.

In an embodiment in which the electronic message includes identification information, the method searches historical data to identify historical data related to one or more prior messages that have matching identification information to that included within the electronic message. The method of this embodiment also constructs the related message by constructing the related message based upon information from the historical data related to the one or more prior messages that have matching identification information in combination with the information provided by the electronic message. In an embodiment in which the electronic message includes information identifying a preferred supplier, the method searches historical data to identify historical data related to one or more prior messages that also reference the preferred supplier. Additionally or alternatively, the method may search the historical data within a predefined window of time.

A method of an example embodiment further includes determining whether a configuration required by the request processor is predefined. In an instance in which the configuration is predefined, the method constructs the related message by constructing the related message based upon the configuration required by the request processor. However, in an instance in which the configuration is not predefined, the method searches historical data to identify information regarding a configuration required by the request processor. The method of this embodiment further includes constructing a trial configuration for the request processor based upon historical data related to one or more prior messages exchanged with one or more processors other than the request processor. A method of an example embodiment constructs the trial configuration by constructing the trial configuration to include one or more data fields based upon a frequency with which the one or more data fields were included in historical data related to one or more prior messages exchanged with one or more processors other than the request processor.

A method of an example embodiment further includes identifying a second electronic message that is a duplicate of the electronic message and that was received via a different connection than the electronic message. In this embodiment, the method additionally includes deferring processing of the second electronic message and constructing a response to the second electronic message based upon the response constructed to the prior electronic message that is to be transmitted via the different connection.

In a further example embodiment, a computer program product is provided that is configured to analyze an electronic message and to construct a related message based upon analysis of the electronic message. The computer program product includes a non-transitory computer readable medium having program code stored thereon with the program code including program code instructions being configured, upon execution, to receive the electronic message and to analyze the electronic message relative to requirements of the related message to determine whether the electronic message includes information required by the related message. In an instance in which the analysis of the electronic message determines that the electronic message satisfies the requirements of the related message, the program code include program code instructions configured to cause the related message to be transmitted to a request processor based upon information provided by the electronic message. In an instance in which the analysis of the electronic message determines that the electronic message fails to satisfy the requirements of the related message, the program code include program code instructions configured to search historical data related to prior messages in order to identify additional information sufficient in combination with the information provided by the electronic message to satisfy the requirements of the related message, program code instructions configured to construct the related message based upon the additional information identified from the historical data and the information provided by the electronic message, and program code instructions configured to cause the related message to be transmitted to the request processor. The program code also include program code instructions configured to receive a response from the request processor based upon the related message. The program code further include program code instructions configured to construct a response to the electronic message that is to be transmitted based upon the response from the request processor. The program code further includes program code instructions configured to store, in a database, one or more of the historical data related to prior messages, the electronic message, the related message, the response from the request processor or the response to the electronic message.

In an embodiment in which the electronic message includes identification information, the program code instructions configured to search historical data include program code instructions configured to identify historical data related to one or more prior messages that have matching identification information to that included within the electronic message. In this embodiment, the program code instructions configured to construct the related message include program code instructions configured to construct the related message based upon information from the historical data related to the one or more prior messages that have matching identification information in combination with the information provided by the electronic message. In an embodiment in which the electronic message includes information identifying a preferred supplier, the program code instructions configured to search historical data include program code instructions configured to identify historical data related to one or more prior messages that also reference the preferred supplier. The program code instructions configured to search historical data may additionally or alternatively search the historical data within a predefined window of time.

BRIEF DESCRIPTION OF THE DRAWINGS

Having thus described certain embodiments of the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A computing device, method and computer program product are provided in accordance with an example embodiment in order to analyze an electronic message and to construct a related message based upon the analysis of the electronic message. For example, in instances in which the electronic message fails to include all of the necessary information sufficient to elicit the desired response from the recipient, the computing device, method and computer program product of an example embodiment may reference historical data including prior messages in order to determine the requisite information lacking in the electronic message. Alternatively, the computing device, method and computer program product of an example embodiment may be configured to identify electronic messages that are duplicates of one another and, as such, may defer processing of the duplicate messages and, instead, may send a copy of the same response to each of the duplicate messages. The computing device, method and computer program product of an example embodiment therefore increase the likelihood that the desired response will be provided by the recipient, while reducing the burden imposed upon the overall system by eliminating or decreasing the additional messaging otherwise required to solicit and provide the information that the electronic message in its original form lacks and/or also while avoiding the inefficiencies associated with the processing of duplicate electronic messages. In this regard, the computing device, method and computer program product of an example embodiment avoid further burdening the network with the transmission of additional messages and correspondingly avoids the imposition of additional processing requirements attributable to the receipt and processing of the additional messages and the generation of responses thereto.

Figure 1:
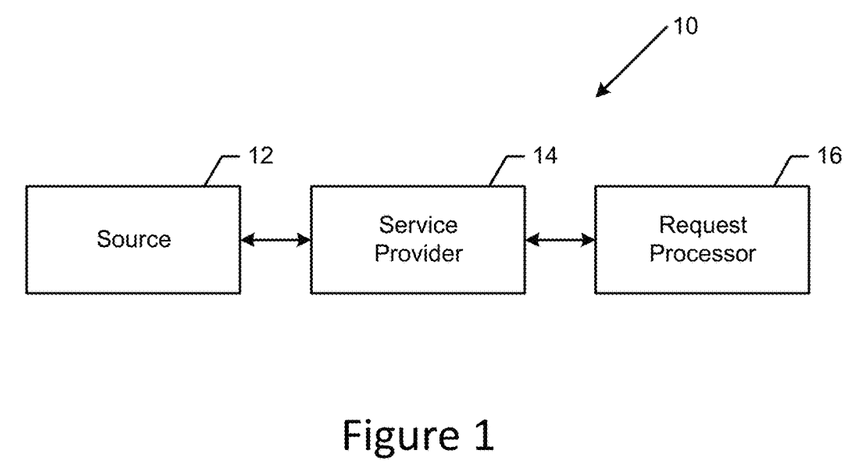
FIG. 1 is a diagram of a system configured to process and exchange electronic messages in accordance with an example embodiment of the present invention.

By way of example, a system 10 that is configured to analyze electronic messages and to construct related messages based upon the analysis of the electronic messages and with reference to historical data related to prior messages is depicted in FIG. 1. As shown, the electronic message may be provided by a source 12 and received by a service provider 14, such as a switch. After analyzing the electronic message provided by the source and constructing a related message with reference to the historical data, the service provider is configured to communicate with a request processor 16. Although the method, computing device and computer program product may be employed in various applications, the method, computing device and computer program product of example embodiments are employed in conjunction with the analysis of electronic messages and the construction of related messages in conjunction with telecommunication applications, content delivery and provisioning and healthcare applications, such as in conjunction with the submission and evaluation of prescription claims, such as a prescription claim submitted by a prescriber, and the provision of feedback regarding reimbursement of the patient by a request processor in the form of a pharmacy benefit manager, a claims payor, e.g., an insurance company or the like, to name but a few.

Figure 2:
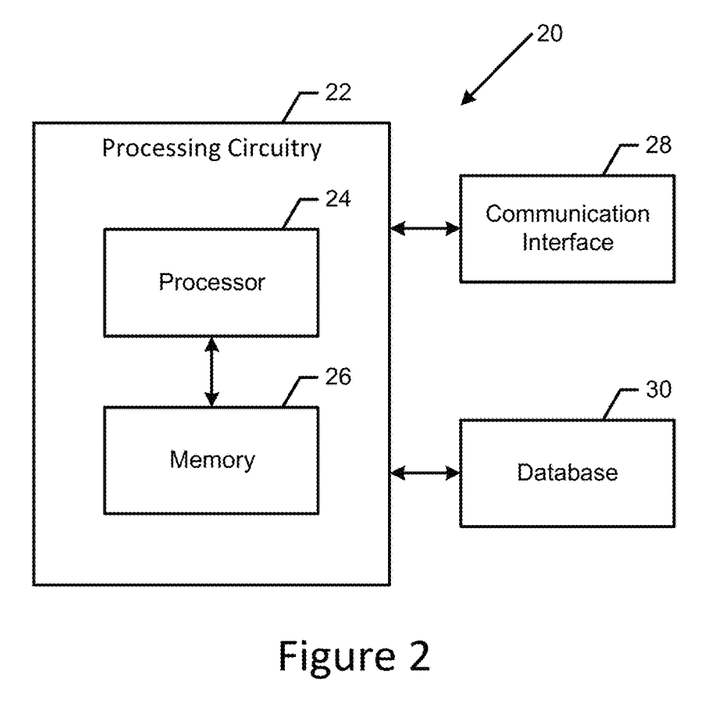
FIG. 2 is a block diagram of a computing device that may be specifically configured in accordance with an example embodiment of the present invention.

The service provider 14 may be configured in various manners, but, in embodiment, the service provider includes a computing device 20 configured to parse and differently process different portions of an electronic message and may be embodied as shown in FIG. 2. In this regard, the computing device that embodies the service provider may include or otherwise be in communication with a processing system including, for example, processing circuitry 22 that is configurable to perform actions in accordance with example embodiments described herein. The processing circuitry may be configured to perform data processing, application execution and/or other processing and management services. The processing circuitry may include a processor 24 and memory 26 that may be in communication with or otherwise control a communication interface 28 and a database 30. The computing device may also include the communication interface and the database as shown in FIG. 2, or the communication interface and/or the database may be separate from, but in communication with, the computing device.

In an example embodiment, the memory 26 may include one or more non-transitory memory devices such as, for example, volatile and/or non-volatile memory that may be either fixed or removable. The memory may be configured to store information, data, applications, instructions or the like for enabling the computing device 20 to carry out various functions in accordance with example embodiments of the present invention. For example, the memory could be configured to buffer input data for processing by the processor 24. Additionally or alternatively, the memory could be configured to store instructions for execution by the processor.

The processor 24 may be embodied in a number of different ways. For example, the processor may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor may be configured to execute instructions stored in the memory 26 or otherwise accessible to the processor. As such, whether configured by hardware or by a combination of hardware and software, the processor may represent an entity (e.g., physically embodied in circuitry—in the form of processing circuitry) specifically configured to perform operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the operations described herein.

The communication interface 28 may include one or more interface mechanisms for enabling communication with the request processor 16 and other entities 18. In this regard, the communication interface may include, for example, an antenna (or multiple antennas) and supporting hardware and/or software for enabling the communications therewith.

The database 30 may be embodied by any of a variety of data storage devices such as a Network Attached Storage (NAS) device or devices, or as a separate database server or servers. The database includes information accessed and stored by the processing circuitry 22 to facilitate the operations of the service provider 14. For example, the database may comprise a series of tables configured to store information regarding different types of messages and/or portions of different types of messages as described below.

Figure 3:
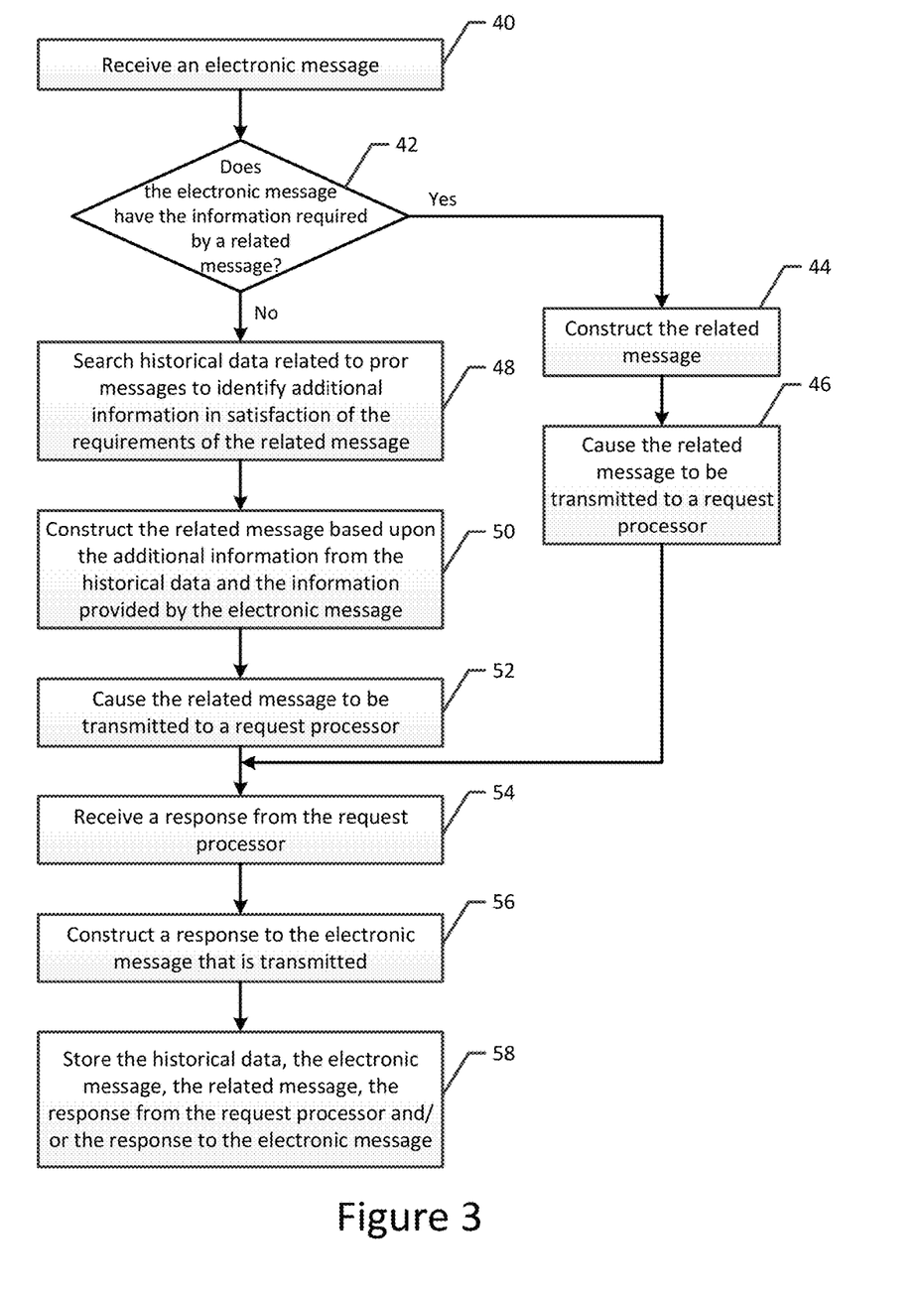
FIG. 3 is a flow chart illustrating the operations performed, such as by the switch of FIG. 1 embodied by the computing device of FIG. 2, in accordance with an example embodiment of the present invention.

The operations performed by the computing device 20 embodied by the service provider 14 are depicted in an example embodiment in FIG. 3. As shown in block 40 of FIG. 3, the computing device includes means, such as the communication interface 28, the processing circuitry 22, the processor 24 or the like, for receiving an electronic message. The electronic message may take many forms depending upon the application. For example, the electronic message may be a message provided in conjunction with a telecommunications application that requests information from a recipient sufficient to permit a telecommunications connection to be established. Alternatively, the electronic message may be a request for content with conjunction with a content delivery and provisioning application. As yet another example, the electronic message may be a prescription benefit coverage request message from a prescriber, e.g., a physican or other healthcare practicioner, of a prescription that solicits benefit information associated with a patient such that the prescriber and/or the patient may determine the cost to the patient in advance of the submission of the prescription, thereby increasing the likelihood that the patient will have the prescription filled. Thus, the prescription benefit coverage request message is processed in order to evaluate a patient's prescription coverage in advance of and without the actual prescription having been written Regardless of the type of electronic message, the electronic message is generated by source 12. For example, in an embodiment in which the electronic message is a prescription benefit coverage request message, the electronic message may be generated by a system operated or controlled by the prescriber or an intermediary, such as an electronic health records system or the like. Although the electronic message is intended to eventually elicit a response from a recipient, such as a request processor 16 as described below, the electronic message is received by a service provider 14 that analyzes the electronic message and that, in turn, directs a related message to the particular request processor that is intended to respond to the electronic message. In this regard, the electronic message that is received by the service provider may be directed to any one of a plurality of different request processors depending upon the nature of the electronic message including, for example, the subject of the electronic message and/or information included within the electronic message identifying the request processor. Thus, based upon the analysis of the electronic message, the service provider formulates a related message that is directed to the appropriate request processor and that is constructed so as to satisfy the requirements of the request processor to which the related message is directed.

As shown in block 42 of FIG. 3, the computing device 20 includes means, such as the processing circuitry 22, the processor 24 or the like, for analyzing the electronic message relative to the requirements of the related message to determine whether the electronic message includes information required by the related message. In this regard, the requirements of the related message may be defined based upon a variety of factors. For example, some requirements of the related message may be predefined with respect to all related messages that are constructed and transmitted to any request processor. Additionally, other requirements of a related message may be specific to the request processor to which the related message is directed based upon, for example, a configuration of the request processor. Regardless of the origin of the requirements for the related message, the computing device, such as the processing circuitry, the processor or the like, determines whether the electronic message provides the information required for construction of the related message.

As shown in blocks 44 and 46 of FIG. 3, the computing device 20 also includes means, such as the processing circuitry 22, the processor 24 or the like, for constructing the related message and means, such as the processing circuitry, the processor, the communications interface 28 or the like, for causing the related message to be transmitted to a request processor 16 in an instance in which the analysis of the electronic message determines that the electronic message provides information sufficient to satisfy the requirements of the related message. The construction of the related message in this situation may involve the redirection of the electronic message to the appropriate request processor, such as determined based upon the electronic message, e.g., based upon the subject of the electronic message, based upon information within the electronic message indicating the request processor to which the related message is to be directed, etc. However, in other embodiments, the related message is constructed based upon information provided by the electronic message but in a different form than that provided by the electronic message, such as in a form that complies with the requirements of the request processor as defined, for example by a configuration predefined by the request processor.

In an instance in which the analysis of the electronic message determines, however, that the electronic message fails to satisfy the requirements of the electronic message, such as by failing to include the requisite information necessary to elicit the desired response from a request processor 16, the related message is constructed in a different fashion. In this regard and as shown in block 48 of FIG. 3, the computing device 20 includes means, such as the processing circuitry 22, the processor 24 or the like, for searching historical data related to prior messages in order to identify additional information sufficient in combination with the information provided by the electronic message to satisfy the requirements of the related message. In this regard, even if the electronic message does not provide sufficient information for the construction of a related message that satisfies the requirements of the request processor necessary to elicit the desired response, the computing device, such as the processing circuitry, the processor or the like, searches the historical data to determine if the additional information that is lacking from the electronic message may be derived from prior messages, such as prior messages involving the same subject, the same request processor or the like. In an instance in which additional information is identified from the historical data that is sufficient in combination with the information provided by the electronic message to satisfy the requirements of the related message, such as defined by the configuration of the request processor to which the related message is to be directed, the computing device, such as the processing circuitry, the processor or the like, is configured to construct a related message based upon the additional information identified from the historical data and the information provided by the electronic message. See block 50 of FIG. 3. In this regard, the related message that is constructed is constructed in a manner that satisfies the requirements of the related message, such as defined by the configuration of the request processor to which the related message is to be directed including, for example, the identification of the subject of the related message and the proper identification of the request processor.

The computing device 20 also includes means, such as the processing circuitry 22, the processor 24, the communications interface 28 or the like, for causing the related message to be transmitted to the request processor 16 as shown in block 52. Following the transmission of the related message the request processor, the service provider 14 and, in particular, the computing device, awaits receipt of a response from the request processor. In this regard, the computing device includes means, such as the processing circuitry, the processor, the communications interface or the like, for receiving a response from the request processor. The type of response depends upon the nature of the related message transmitted to the request processor which, in turn, depends upon the application in which the computing device is deployed as noted above. Examples of a response from the request processor are provided below for purposes of illustration, but not of limitation.

The computing device 20 also includes means, such as the processing circuitry 22, the processor 24 or the like, for constructing a response to the electronic message that is transmitted as shown in block 56 of FIG. 3. The response that is constructed to the electronic message is based upon the response provided by the request processor 16. In this regard, the response constructed by the computing device may be the same as the response from the request processor or may be based upon the response from the request processor so as to include information provided by the request processor along with additional information and/or a reformatting of the information. The response to the electronic message constructed by the computing device is then transmitted, such as to the source 12 of the electronic message. Depending upon the application, the response to the electronic message may provide a variety of different types of information. In relation to a telecommunications application, the response may provide information that facilitates the subsequent establishment of a telecommunications connection. In relation to content delivery and provisioning, the response to the electronic message may provide information sufficient to permit the requested content to be subsequently downloaded or streamed. In conjunction with a pharmacy benefit coverage request message, the response to the source may provide information outlining the prescription benefit coverage available to the patient and/or the patient copay information, such as the copay amount, in conjunction with a particular prescription that the prescriber is considering prescribing to the patient.

Regardless of the particular application, the computing device 20 includes means, such as the processing circuitry 22, the processor 24, the database 30 or the like, for storing the historical data related to prior messages, the electronic message, the related message, the response from the request processor 16 and/or the response to the electronic message. For example, each of these messages and responses may be stored in the database, such as in separate tables with each table of the database configured to store a different type of message or response. As such, the database allows prior messages and responses to be readily recalled without having to re-construct the messages or responses. In addition, the database provides an audit trail associated with the handling of the different electronic requests.

Figure 4:
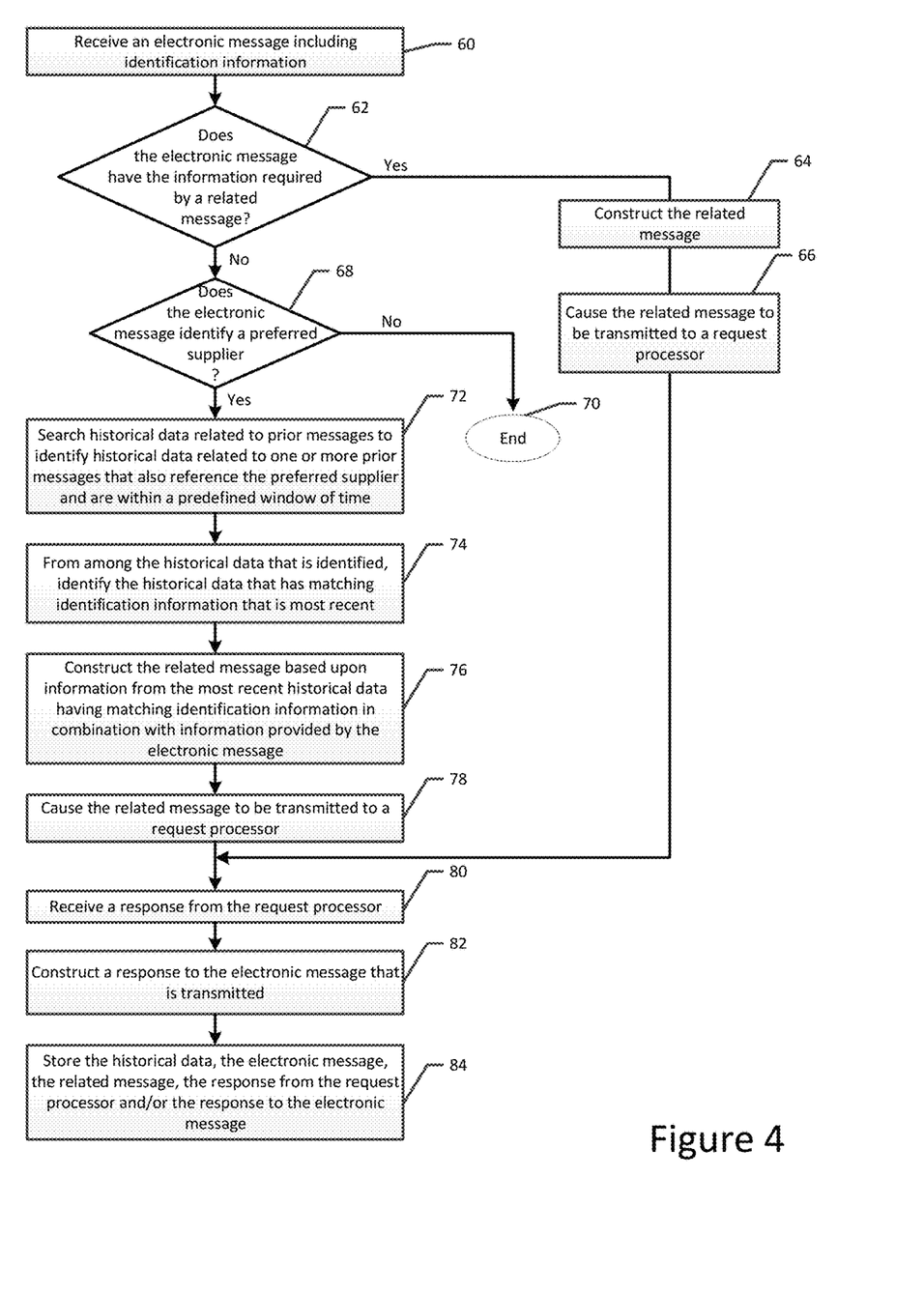
FIG. 4 is a flow chart illustrating the operations performed, such as by the switch of FIG. 1 embodied by the computing device of FIG. 2, in accordance with another example embodiment of the present invention in which information is obtained from prior messages having matching identification information.

Referring now to FIG. 4, an example embodiment in which the electronic message is to be directed to a preferred supplier, but the electronic message fails to include all of the information required by the request processor 16, such as defined by a configuration of the particular request processor. In this example embodiment, the computing device 20 includes means, such as the processing circuitry 22, the processor 24, the communications interface 28 or the like, for receiving an electronic message including identification information. See block 60 of FIG. 4. In this regard, the identification information may identify the subject of the request, such as a patient in conjunction with a pharmacy benefit coverage request message. The computing device of this example embodiment includes means, such as the processing circuitry, the processor or the like, for determining whether the electronic message has the information required by a related message that is to be directed to a particular request processor. See block 62. In this regard, the computing device, such as the processing circuitry, the processor or the like, is configured to determine, by reference to the configuration of the request processor, whether the electronic message includes all of the information required by the request processor, such as a claims processor, such as a claims processor of a pharmacy benefit manager or a payor of prescription claims, e.g., an insurance company, in an embodiment in which the electronic message is a pharmacy benefit coverage request message. As described above in conjunction with the embodiment of FIG. 3, in an instance in which the analysis of the electronic message determines that the electronic message satisfies the requirements of the related message, the computing device includes means, such as the processing circuitry, the processor or the like, for constructing the related message based upon information provided by the electronic message and means, such as the processing circuitry, the processor, the communications interface or the like, for causing the related message to be transmitted to the request processor. See blocks 64 and 66 of FIG. 4.

In conjunction with an embodiment in which the electronic message is a pharmacy benefit coverage request message, the computing device 20, such as the processing circuitry 22, the processor 24 or the like, is configured to determine whether the electronic message includes not only identification information identifying the subject, such as a patient, of the electronic message, but also benefit information identifying the prescription insurance of the patient. The prescription insurance of the patient may be identified in various manners including, for example, by a benefit identification number (BIN), pharmacy control number (PCN), cardholder identification (ID) and/or group ID of the patient. However, in an instance in which the analysis of the electronic message determines that the electronic message fails to satisfy the requirements of the related message, such as by not including the benefit information of the patient in an embodiment in which the electronic message is a pharmacy benefit coverage request message, the computing device includes means such as the processing circuitry, the processor or the like, for determining whether the electronic message identifies a preferred supplier, such as a preferred pharmacy. See block 68 of FIG. 4. In an instance in which the electronic message does not identify a preferred supplier, the process may conclude. See block 70.

However, if the electronic message does identify a preferred supplier, such as a preferred pharmacy in an embodiment in which the electronic message is a pharmacy benefit coverage request message, the computing device 20 includes means, such as the processing circuitry 22, the processor 24 or the like, for searching historical data related to prior messages to identify historical data related to one or more prior messages that also reference the preferred supplier. See block 72 of FIG. 4. From among the historical data that is identified, such as prior messages also referencing the same preferred supplier, the computing device includes means, such as the processing circuitry, the processor or the like, for identifying the historical data that has matching identification information as the identification information provided by the electronic message. See block 74. In the context of a pharmacy benefit coverage request message, the identification information may identify the patient such that the search of historical data and the identification of historical data that has matching identification information identifies historical data, such as prior messages, related to the same patient.

The identification information may be provided in various manners including, for example, the first name of the patient, the last name of the patient, the date of birth of the patient, the gender of the patient and the zip code of the patient. In conjunction with the identification of historical data with matching identification information, the computing device 20, such as the processing circuitry 22, the processor 24 or the like, may be configured to utilize one or more of the particular forms of identification information in a predefined combination in order to identify historical data related to the same patient. For example, the computing device, such as the processing circuitry, the processor or the like, may be configured to identify matching identification information in an instance in which the first name, last name, date of birth and zip code of the identification information from the electronic message exactly matches the corresponding identification information of the historical data.

In an example embodiment, the computing device 20 does not necessarily review all historical data and, instead, is configured to review historical data related to one or more prior messages that reference the preferred supplier that are within a predefined window of time, such as within an immediately prior period of time, such as within past 180 days, thereby increasing the efficiency with which the search may be conducted and increasing the likelihood that the additional information gleaned from the historical data remains current and accurate. In relation to the identification of the historical data that has matching identification information as shown in block 74, the computing device, such as the processing circuitry 22, the processor 24 or the like, is configured to identify the most recent historical data that references the preferred supplier and that has matching identification information, thereby further increasing the likelihood that the resulting information, e.g., the benefit information, gleaned from the historical data remains accurate.

As shown in block 76 of FIG. 4, the computing device 20 includes means, such as the processing circuitry 22, the processor 24 or the like, for constructing a related message based upon information from the historical data having matching identification information, such as the most recent historical data referencing the preferred supplier and having matching identification information, in combination with information provided by the electronic message. In relation to an embodiment to which the electronic message is a pharmacy benefit coverage request message, the related message that is constructed may include some form of the identification information identifying the patient as well as some form of the benefit information derived from the historical data having matching identification information in order to permit the request processor 16 to determine the prescription benefit coverage available to the patient for a prescription that is under consideration by the prescriber. By way of example, the related message may include several categories of data, each of which includes one or more fields of information, including categories related to: (i) the patient's benefit information, (ii) drug information related to the prescription in question, (iii) the patient's preferred pharmacy or a pharmacy selected for the patient if the patient does not have a preferred pharmacy, (iv) the identification number and address of the prescriber and (v) drug pricing information.

The computing device 20 also includes means, such as the processing circuitry 22, the processor 24, the communications interface 28 or the like, for causing the related message that has been constructed to be transmitted to the request processor 16 and means, such as the processing circuitry, the processor, the communications interface or the like, for subsequently receiving a response from the request processor as shown in blocks 78 and 80 of FIG. 4 and as described above in conjunction with blocks 52 and 54 of FIG. 3. The computing device further includes means, such as the processing circuitry, the processor, the communications interface or the like, for constructing a response to the electronic message that is transmitted. See, for example, block 82 of FIG. 4 as described in more detail in conjunction with block 56 of FIG. 3. In conjunction with a pharmacy benefit coverage request message, the response transmitted to the source 12, such as a prescriber, provides information related to the patient's prescription benefit coverage and/or the patient's copay information, such as the copay amount, thereby enabling the patient and/or the prescriber to make an informed decision as to whether the prescription in question is financially viable for the patient. For example, the response may provide an indication as to the coverage provided by the claims payor for the prescription that is the subject of the pharmacy benefit coverage request message. If coverage is provided, the response may provide a reimbursement amount indicative of the monetary amount for which the pharmacy will be reimbursed by the claims payor in response to dispensation of the medicine that is the subject of the prescription from which the amount that the patient will have to pay may be determined. If coverage is not provided, however, the response may provide an indication as to the reason for the denial.

In instances in which coverage is indicated to be provided, a reversal request transaction may be constructed and transmitted to the request processor. The request processor 16 may adjudicate the reversal request transaction so as to reverse the prescription coverage previously indicated to be provided. Thus, the service provider 14 and, in turn, the source 12, such as the prescriber, is provided with information regarding the patient's prescription benefit coverage without causing the prescription coverage to, in fact, be provided as the source, such as the prescriber, is generally gathering information in advance of writing the actual prescription which will subsequently be submitted for adjudication in a conventional manner. As described above in conjunction with block 58 of FIG. 3, the historical data, electronic message, the related message, the response from the request processor and/or the response to the electronic message may all be stored, such as by the database 30, as shown in block 84 of FIG. 4.

Figure 5:
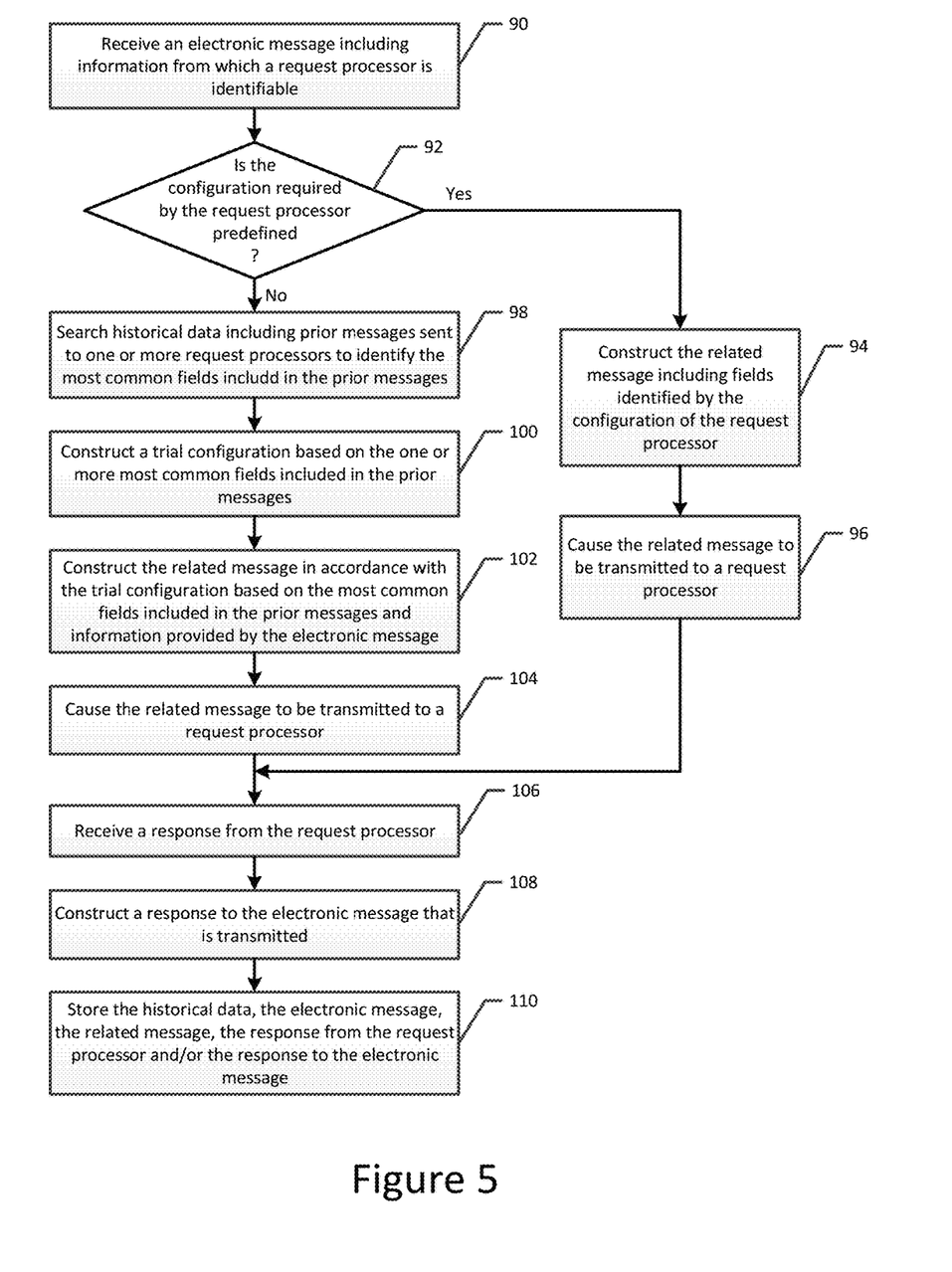
FIG. 5 is a flow chart illustrating the operations performed, such as by the switch of FIG. 1 embodied by the computing device of FIG. 2, in accordance with another example embodiment of the present invention in which information is obtained from prior messages to permit a trial configuration for a request processor to be constructed.

Referring now to FIG. 5, an embodiment is provided in which the configuration of the request processor 16 which defines the information required by the request processor and the format, order and other details regarding the requisite information is not predefined or is not otherwise available to the computing device 20, thereby preventing the service provider 14 from querying the request processor so as to solicit the desired response to the electronic message. In this example embodiment, the configuration or at least the most likely configuration of the request processor is determined based upon historical data so as to permit the related message to be transmitted to the request processor and the appropriate response received therefrom without requiring the additional messaging otherwise required in an effort to identify the configuration of the request processor.

In this example embodiment, the computing device 20 includes means, such as the process circuitry 22, the processor 24, the communications interface 28 or the like, for receiving an electronic message including information from which a request processor 16 is identifiable. See block 90 of FIG. 5. The request processor may be identifiable in various manners depending upon, for example, the application in which the computing device is deployed. In an example embodiment in which the electronic message is a pharmacy benefit coverage request message, the request processor may be identified explicitly or may be identified based upon identification information included within the electronic message identifying the patient and the benefit information associated with the patient which may, in turn, be unique to a particular request processor. In this example embodiment, the computing device determines whether the electronic message has the information required by a related message as described generally by block 42 of FIG. 3 by, among other things, determining whether the configuration of the request processor is predefined since the configuration of the request processor defines the information required by the related message including, for example, the information that is required, the format and order of the information and the like. As such, the computing device includes means, such as the processing circuitry, the processor or the like, for determining whether the configuration required by the request processor is predefined. This determination may be based upon a search of the memory 26 and/or the database 30 to identify and retrieve the configuration required by the request processor in an instance in which the configuration is predefined.

In an instance in which the configuration required by the request processor 16 is predefined, the computing device 20 includes means, such as the processing circuitry 22, the processor 24 or the like, for constructing the related message including the fields of information identified by the configuration of the request processor based upon, at least in part, the information provided by the electronic message. See block 94 of FIG. 5 as well as the more general discussion provided above in conjunction with block 46 of FIG. 3. In this instance, the computing device also includes means, such as the processing circuitry, the processor, the communications interface 28 or the like, for causing the related message to be transmitted to the request processor as shown in block 96 and as described above in conjunction with block 46 of FIG. 3.

In an instance in which the configuration required by the request processor 16 is not predefined or otherwise available to the service provider 14, the computing device 20 includes means, such as the processing circuitry 22, the processor 24 or the like, for searching historical data including prior messages sent to one or more request processors to identify the information included in the prior messages. See block 98 of FIG. 5. While the search may focus upon and consider only historical data including prior messages sent to the request processor identifiable from the electronic message, the search of other example embodiments searches historical data including prior messages sent to a number of different request processors, optionally including but not necessarily including, the request processor identified from the electronic message, in order to identify the information included in the prior messages. With respect to the information that is identified from the prior messages, the computing device, such as the processing circuitry, the processor or the like, is configured to identify the fields of information that are most commonly included in the prior messages. Thus, the computing device, such as the processing circuitry, the processor or the like, is configured to identify the frequency with which the different fields of information are included in the prior messages and to identify those fields of information that have the greatest frequency of inclusion in the prior messages.

The computing device 20 of this example embodiment also includes means, such as the processing circuitry 22, the processor 24 or the like, for constructing a trial configuration for the request processor 16 based on the one or more most common fields of information included in the prior messages. See block 100 of FIG. 5. In this regard, the computing device, such as the processing circuitry, the processor or the like, is configured to construct the trial configuration so as to identify the most common fields of information to be included in a related message directed to the request processor. With respect to the one or more fields of information that are considered to be most common, the most common fields of information may be defined in various manners, such as the fields of information that are included in the prior messages with a frequency that exceeds a predefined threshold, such as by being included in a least 50% of the prior messages. Additionally or alternatively, the fields of information that are considered most common may be a predefined number or percentage of fields of information identified from the prior messages that appear with the greatest frequency.

The computing device 20 of this example embodiment also includes means, such as the processing circuitry 22, the processor 24 or the like, for constructing the related message in accordance with the trial configuration based on the most common fields included in the prior messages as well as information provided by the electronic message. See block 102 of FIG. 5. Thereafter, the computing device includes means, such as the processing circuitry, the processor, the communications interface 28 or the like, for causing the related message to be transmitted to the request processor 16 as shown in block 104 and as described above in conjunction with block 52 of FIG. 3. By constructing the related message not only based upon information provided by the electronic message, but constructing a related message in a manner that includes the most common fields of information as defined by prior messages to the same and/or other request processors, the likelihood that the related message is interpretable by the request processor and will elicit the desired response is increased, thereby increasing the efficiency of the overall process and reducing the failure rate associated with electronic messages received by the service provider 14.

In this regard, the computing device 20 also includes means, such as the processing circuitry 22, the processor 24, the communications interface 28 or the like, for subsequently receiving a response from the request processor 16 as shown in block 106 of FIG. 5 and as described above in conjunction with block 54 of FIG. 3. The computing device further includes means, such as the processing circuitry, the processor, the communications interface or the like, for constructing a response to the electronic message that is transmitted. See, for example, block 108 of FIG. 5 as described in more detail in conjunction with block 56 of FIG. 3. In conjunction with a pharmacy benefit coverage request message, the response transmitted to the source 12, such as a prescriber, provides information related to the patient's prescription benefit coverage and/or the patient's copay information, such as the copay amount, thereby enabling the patient and/or the prescriber to make an informed decision as to whether the prescription in question is financially viable for the patient.

In instances in which coverage is indicated to be provided, a reversal request transaction may be constructed and transmitted to the request processor for adjudication in the manner described above. As described above in conjunction with block 58 of FIG. 3, the historical data, electronic message, the related message, the response from the request processor 16 and/or the response to the electronic message may all be stored, such as by the database 30, as shown in block 110 of FIG. 5.

In addition to constructing a trial configuration and then eliciting a response to the electronic message based upon a related message constructed in accordance with the trial configuration, an administrator may be notified that the configuration for the request processor 16 is not available. As such, the administrator may construct a configuration for the request processor such that subsequent electronic messages intended to elicit a response from the request processor may be processed in accordance with a predefined configuration and need not require a trial configuration to be constructed. The configuration constructed by the administrator may be based upon the trial configuration or may alternatively be constructed independent of the trial configuration.

Figure 6:
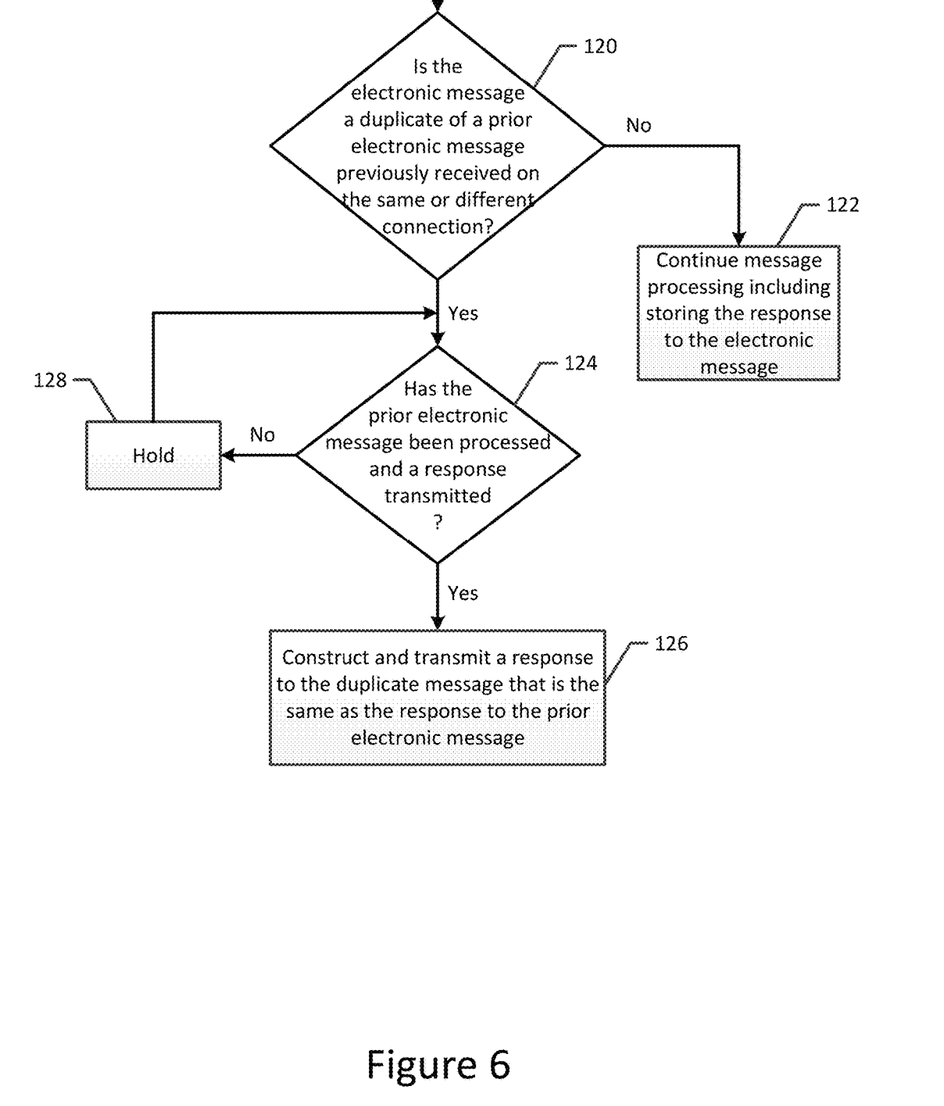
FIG. 6 is a flow chart illustrating the operations performed, such as by the switch of FIG. 1 embodied by the computing device of FIG. 2, in accordance with another example embodiment of the present invention in which the processing of duplicate messages received via the same or a different connection is deferred pending processing of an initial message.

Referring now to FIG. 6, an embodiment in which duplicate messages are identified and responses are generated for the duplicate messages without further processing of the duplicate messages, thereby increasing the efficiency of the overall process. In this regard, after having received the electronic message, such as described in conjunction with block 40 of FIG. 3 and prior to analyzing or otherwise processing the electronic message as described by decision block 42 and the subsequent operations of FIG. 3, the computing device 20 of this example embodiment includes means, such as the processing circuitry 22, the processor 24 or the like, for determining whether the electronic message that is received is a duplicate of a prior electronic message previously received via either the same or a different connection. See block 120 of FIG. 6. In this regard, the electronic messages that are received may be received via one or more connections. In conjunction with a pharmacy benefit coverage request message, electronic messages may be received from the prescriber, such as from an electronic health record system of the prescriber via a first connection. Additionally, electronic messages may be received from an intermediary between the prescriber and the service provider 14, such as from a provider system and/or from an aggregator, via a second, different connection. Thus, in some instances, the same electronic message, such as the same pharmacy benefit coverage request message, may be submitted both by the prescriber and by an intermediary via different connections. Although the computing device may be configured to consider all prior electronic messages in relation to a determination as to whether the electronic message most recently received is a duplicate, the computing device, such as the processing circuitry, the processor or the like, of an example embodiment may be configured to review only those prior electronic messages that were received within a particular period of time, such as within a predefined window of time preceding the receipt of the electronic message that is the subject of this duplicate analysis.

In this instance, the computing device 20, such as the processing circuitry 22, the processor 24 or the like, is configured to identify a second or subsequent message as a duplicate in instances in which the subsequent message is identical to a prior electronic message. In an instance in which the electronic message is not a duplicate of a prior electronic message, the processing of the electronic message may proceed as shown in block 122 and as described in conjunction with the embodiment of FIG. 3, such as by initially determining whether the electronic message has the information required for a related message as shown, for example in block 42.

However, in an instance in which the electronic message is identified to be a duplicate, the computing device 20 of this example embodiment includes means, such as the processing circuitry 22, the processor 24 or the like, for determining whether the prior electronic message for which the electronic message under consideration is a duplicate has been processed and a response transmitted, such as to the source 12. See block 124 of FIG. 6. In an instance in which the prior electronic message has been processed and a response thereto has been transmitted, the computing device of this example embodiment includes means, such as the processing circuitry, the processor, the communications interface 28 or the like, for constructing a response to the duplicate message that is the same as the response to the prior electronic message and thereafter transmitting the response to the duplicate message. See block 126. By responding to the duplicate message in this manner, a response is actually provided in order to complete the inquiry that was initiated by the construction and transmission of the duplicate message, but the response that is provided is done so in a manner that does not require additional processing and is also done in a manner that is consistent with the response to the prior message.

In an instance in which the electronic message is a duplicate of a prior message, but the prior electronic message has not been processed and/or a response to the prior electronic message has not been transmitted, the duplicate message is held in abeyance. For example, the duplicate message may be held for a predefined period of time as shown in block 128 of FIG. 6 prior to reconsidering whether the prior electronic message has been processed and a response transmitted. This process may be repeated until it is determined that the prior electronic message has been processed and a response transmitted at which time the same response may be constructed and transmitted for the duplicate message as described above in conjunction with block 126.

As noted above, FIGS. 3-6 are flowcharts illustrating the operations performed by a method, apparatus and computer program product, such as computing device 10 of FIG. 2, in accordance with one embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 16 of a computing device employing an embodiment of the present invention and executed by a processor 14 of the computing device. As will be appreciated, any such computer program instructions may be loaded onto a computer or other programmable apparatus (e.g., hardware) to produce a machine, such that the resulting computer or other programmable apparatus provides for implementation of the functions specified in the flowchart blocks. These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks. As such, the operations of FIGS. 3-6, when executed, convert a computer or processing circuitry into a particular machine configured to perform an example embodiment of the present invention. Accordingly, the operations of FIGS. 3-6 define an algorithm for configuring a computer or processing circuitry, e.g., processor, to perform an example embodiment. In some cases, a general purpose computer may be provided with an instance of the processor which performs the algorithm of FIGS. 3-6 to transform the general purpose computer into a particular machine configured to perform an example embodiment.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions. In some embodiments, certain ones of the operations above may be modified or further amplified and additional optional operations may be included. It should be appreciated that each of the modifications, optional additions or amplifications below may be included with the operations above either alone or in combination with any others among the features described herein.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A computing device configured to analyze an electronic message and to construct a related message based upon analysis of the electronic message, the computing device comprising:

a communication interface configured to receive the electronic message;

processing circuitry configured to:

analyze the electronic message relative to requirements of the related message to determine whether the electronic message includes information required by the related message, wherein the information required by the related message is based upon a configuration or a most likely configuration of a request processor to which the related message will be transmitted or fields of information included in prior messages to one or more request processors;

in an instance in which the analysis of the electronic message determines that the electronic message satisfies the requirements of the related message, cause the related message to be transmitted to the request processor based upon information provided by the electronic message;

in an instance in which the analysis of the electronic message determines that the electronic message fails to satisfy the requirements of the related message, search historical data related to prior messages in order to identify additional information sufficient to supplement absent information of the electronic message and in combination with the information provided by the electronic message to satisfy the requirements of the related message, construct the related message based upon the additional information identified from the historical data and the information provided by the electronic message, and cause the related message to be transmitted to the request processor, wherein failing to satisfy the requirements of the related message comprises determining information required by the related message is absent in the related message;

based upon the related message, receive a response from the request processor; and based upon the response from the request processor, construct a response to the electronic message that is to be transmitted; and a database in communication with the processing circuitry and configured to store one or more of the historical data related to prior messages, the electronic message, the related message, the response from the request processor or the response to the electronic message.

2. A computing device according to claim 1 wherein the electronic message includes identification information, wherein the processing circuitry is configured to search historical data by searching the historical data to identify historical data related to one or more prior messages that have matching identification information to that included within the electronic message, and wherein the processing circuitry is configured to construct the related message by constructing the related message based upon information from the historical data related to the one or more prior messages that have matching identification information in combination with the information provided by the electronic message.

3. A computing device according to claim 1 wherein the electronic message includes information identifying a preferred supplier, and wherein the processing circuitry is configured to search historical data by searching the historical data to identify historical data related to one or more prior messages that also reference the preferred supplier.

4. A computing device according to claim 1 wherein the processing circuitry is configured to search historical data by searching the historical data within a predefined window of time.

5. A computing device according to claim 1 wherein the processing circuitry is further configured to determine whether the configuration required by the request processor is predefined, and wherein, in an instance in which the configuration is predefined, the processing circuitry is configured to construct the related message by constructing the related message based upon the configuration required by the request processor.

6. A computing device according to claim 5 wherein, in an instance in which the configuration is not predefined, the processing circuitry is configured to search historical data by searching historical data to identify information regarding a configuration required by the request processor, and wherein the processing circuitry is further configured to construct a trial configuration for the request processor based upon historical data related to one or more prior messages exchanged with one or more processors other than the request processor.

7. A computing device according to claim 6 wherein the processing circuitry is configured to construct the trial configuration by constructing the trial configuration including one or more data fields based upon a frequency with which the one or more data fields were included in historical data related to one or more prior messages exchanged with one or more processors other than the request processor.

8. A computing device according to claim 1 wherein the processing circuitry is further configured to identify a second electronic message that is a duplicate of the electronic message and that was received via a different connection than the electronic message, to defer processing of the second electronic message and to construct a response to the second electronic message based upon the response constructed to the electronic message that is to be transmitted via the different connection.

9. A method for analyzing an electronic message and constructing a related message based upon analysis of the electronic message, the method comprising:

receiving the electronic message;

analyzing the electronic message relative to requirements of the related message to determine whether the electronic message includes information required by the related message, wherein the information required by the related message is based upon a configuration or a most likely configuration of a request processor to which the related message will be transmitted or fields of information included in prior messages to one or more request processors;

in an instance in which the analysis of the electronic message determines that the electronic message satisfies the requirements of the related message, causing the related message to be transmitted to the request processor based upon information provided by the electronic message;

in an instance in which the analysis of the electronic message determines that the electronic message fails to satisfy the requirements of the related message, searching historical data related to prior messages in order to identify additional information sufficient to supplement absent information of the electronic message and in combination with the information provided by the electronic message to satisfy the requirements of the related message, constructing the related message based upon the additional information identified from the historical data and the information provided by the electronic message, and causing the related message to be transmitted to the request processor, wherein failing to satisfy the requirements of the related message comprises determining information required by the related message is absent in the related message;

based upon the related message, receiving a response from the request processor;

based upon the response from the request processor, constructing a response to the electronic message that is to be transmitted; and storing one or more of the historical data related to prior messages, the electronic message, the related message, the response from the request processor or the response to the electronic message.

10. A method according to claim 9 wherein the electronic message includes identification information, wherein searching historical data comprises searching the historical data to identify historical data related to one or more prior messages that have matching identification information to that included within the electronic message, and wherein constructing the related message comprises constructing the related message based upon information from the historical data related to the one or more prior messages that have matching identification information in combination with the information provided by the electronic message.

11. A method according to claim 9 wherein the electronic message includes information identifying a preferred supplier, and wherein searching historical data comprises searching the historical data to identify historical data related to one or more prior messages that also reference the preferred supplier.

12. A method according to claim 9 wherein searching historical data comprises searching the historical data within a predefined window of time.

13. A method according to claim 9 further comprising determining whether the configuration required by the request processor is predefined, and wherein, in an instance in which the configuration is predefined, constructing the related message by constructing the related message based upon the configuration required by the request processor.

14. A method according to claim 13 wherein, in an instance in which the configuration is not predefined, searching historical data comprises searching historical data to identify information regarding a configuration required by the request processor, and wherein the method further comprises constructing a trial configuration for the request processor based upon historical data related to one or more prior messages exchanged with one or more processors other than the request processor.

15. A method according to claim 14 wherein constructing the trial configuration comprises constructing the trial configuration including one or more data fields based upon a frequency with which the one or more data fields were included in historical data related to one or more prior messages exchanged with one or more processors other than the request processor.

16. A method according to claim 9 further comprising identifying a second electronic message that is a duplicate of the electronic message and that was received via a different connection than the electronic message, deferring processing of the second electronic message and constructing a response to the second electronic message based upon the response constructed to the electronic message that is to be transmitted via the different connection.

17. A computer program product configured to analyze an electronic message and to construct a related message based upon analysis of the electronic message, the computer program product comprising a non-transitory computer readable medium having program code stored thereon, the program code comprising program code instructions configured, upon execution, to:

receive the electronic message;

analyze the electronic message relative to requirements of the related message to determine whether the electronic message includes information required by the related message, wherein the information required by the related message is based upon a configuration or a most likely configuration of a request processor to which the related message will be transmitted or fields of information included in prior messages to one or more request processors;

in an instance in which the analysis of the electronic message determines that the electronic message satisfies the requirements of the related message, cause the related message to be transmitted to the request processor based upon information provided by the electronic message;

in an instance in which the analysis of the electronic message determines that the electronic message fails to satisfy the requirements of the related message, search historical data related to prior messages in order to identify additional information sufficient to supplement absent information of the electronic message and in combination with the information provided by the electronic message to satisfy the requirements of the related message, construct the related message based upon the additional information identified from the historical data and the information provided by the electronic message, and cause the related message to be transmitted to the request processor, wherein failing to satisfy the requirements of the related message comprises determining information required by the related message is absent in the related message;

based upon the related message, receive a response from the request processor;

based upon the response from the request processor, construct a response to the electronic message that is to be transmitted; and in a database, store one or more of the historical data related to prior messages, the electronic message, the related message, the response from the request processor or the response to the electronic message.

18. A computer program product according to claim 17 wherein the electronic message includes identification information, wherein the program code instructions configured to search historical data comprise program code instructions configured to search the historical data to identify historical data related to one or more prior messages that have matching identification information to that included within the electronic message, and wherein the program code instructions configured to construct the related message comprise program code instructions configured to construct the related message based upon information from the historical data related to the one or more prior messages that have matching identification information in combination with the information provided by the electronic message.

19. A computer program product according to claim 17 wherein the electronic message includes information identifying a preferred supplier, and wherein the program code instructions configured to search historical data comprise program code instructions configured to search the historical data to identify historical data related to one or more prior messages that also reference the preferred supplier.

20. A computer program product according to claim 17 wherein the program code instructions configured to search historical data comprise program code instructions configured to search the historical data within a predefined window of time.

* * * * *

UNITED STATES PATENT AND TRADEMARK OFFICE
CERTIFICATE OF CORRECTION

Page 1 of 1

PATENT NO. : 10,616,146 B1
APPLICATION NO. : 15/427746
DATED : April 7, 2020
INVENTOR(S) : Stacy Hopkins and Beth Kaye It is certified that error appears in the above-identified patent and that said Letters Patent is hereby corrected as shown below:

In the Claims

At Claim 1, Column 19, Line 35, "is absent in the related message" should read --is absent in the electronic message--

At Claim 9, Column 21, Line 6, "is absent in the related message" should read --is absent in the electronic message--

At Claim 17, Column 22, Line 37, "is absent in the related message" should read --is absent in the electronic message--

Signed and Sealed this
Twenty-seventh Day of April, 2021

Drew Hirshfeld
*Performing the Functions and Duties of the*
*Under Secretary of Commerce for Intellectual Property and*
*Director of the United States Patent and Trademark Office*